C. M. JONES.
TIRE CARRIER.
APPLICATION FILED APR. 13, 1917.
1,267,227.
Patented May 21, 1918.
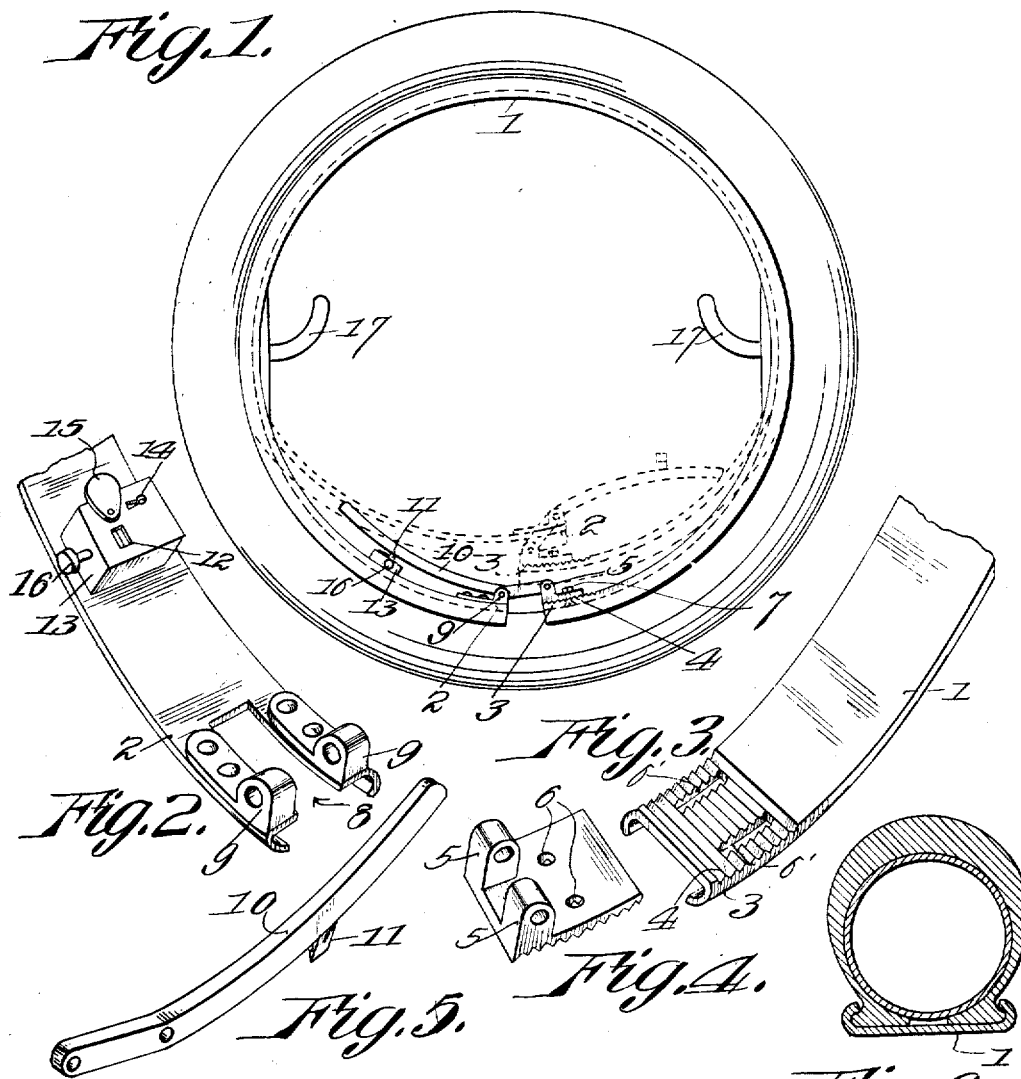
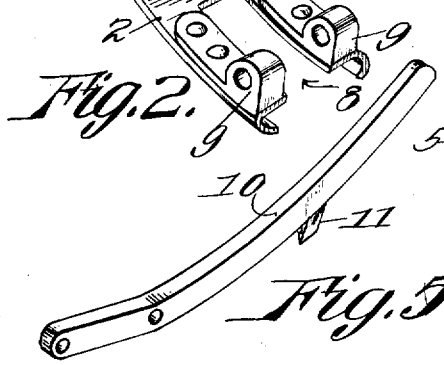
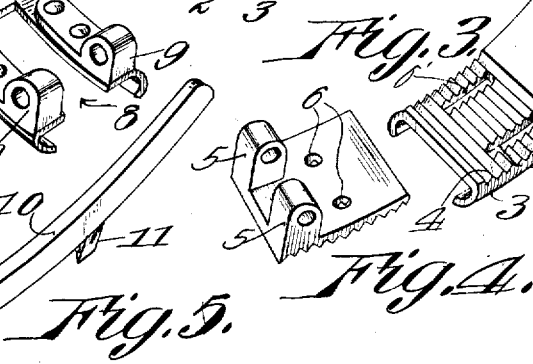
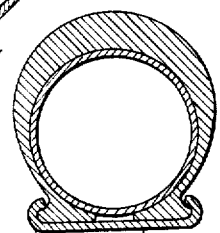
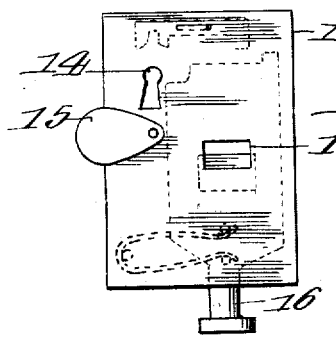
Inventor
C. M. Jones
By Edwin S Clarkson
his Attorney

UNITED STATES PATENT OFFICE.

CHARLES M. JONES, OF NORTH YAKIMA, WASHINGTON.

TIRE-CARRIER.

1,267,227.   Specification of Letters Patent.   Patented May 21, 1918.

Application filed April 13, 1917. Serial No. 161,841.

*To all whom it may concern:*

Be it known that I CHARLES M. JONES, a citizen of the United States of America, residing at North Yakima, in the county of Yakima and State of Washington, have invented certain new and useful Improvements in Tire-Carriers, of which the following is a specification.

The object of my invention is to provide a tire carrier of cheap, simple, but effective construction, with locking means therefor, the parts being so constructed as to eliminate rattling.

A further object of my invention is to provide a tire carrier comprising a split rim, and a single element connected to both ends of said split rim by means of which the rim may be expanded or contracted.

A further object of my invention is to provide a carrier for the clencher tires as well as for demountable rim tires; and with these and other objects in view my invention consists of the parts and combination of parts as will be hereinafter more fully described.

In the drawings:—

Figure 1 is a front elevation of my improved tire carrier.

Figs. 2 and 3 are perspective views of the end portions of the split rim.

Fig. 4 is a detail perspective view of one of the hinge members.

Fig. 5 is a perspective view of the locking and operating lever.

Fig. 6 is a transverse sectional view through a tire and the carrier.

Fig. 7 is a plan view of the lock.

The reference numeral 1 designates a split rim of the same size as the rim of the wheel for clencher tires and is shaped the same as the usual rim of a wheel built to receive clencher tires.

As stated the rim is split whereby ends 2 and 3 are formed.

The end 3 of the rim is provided with serrations 4 extending transversely on its inner face. 5 is a hinge member, the under face of which is provided with transverse serrations which are adapted to intermesh with the serrations 4 of the inner face of the rim. The hinge member is also provided with bolt openings 6 which register with the elongated slots 6' in the rim, said hinge member being secured to the end 3 of the rim by means of the bolts 7. The object of the serrations and the elongated bolt openings is to provide for an adjustment of the hinge on the hinge member toward and away from the end 3 of the split rim so as to regulate the tension of the rim on the tire, as will be hereinafter explained.

The other end 2 of the split rim is provided with an elongated slot 8 extending longitudinally of the rim and open at the end of the rim. Suitable lugs 9 are secured to the end 2 of the rim on each side of the elongated slot 8.

A lever 10, of suitable shape, is secured at one end of the split rim by being pivoted in the hinge member 5, said lever being also secured to the other end of the split rim by being pivotally secured, intermediate its ends, to the lugs 9 so that I provide a single rigid lever connecting the two ends of the split rim and directly pivoted to the two ends of the split rim.

The lever 10 is provided with a depending catch 11 which is adapted to enter the opening 12 and be engaged by a spring catch in the lock casing 13, said lock casing having a suitable key opening 14 and the key opening guard 15. This lock may be of the tumbler type or any other suitable type. The spring catch of the lock is provided with an arm 16 which extends outside of the casing so that the spring latch may be operated by the pressure of a hand upon said arm 16 to release the spring latch from engagement with the catch 11. Of course to secure the member 10 in its locked position, against unauthorized movement, the catch bolt is suitably locked against movement by means of a key.

The carrier is suitably mounted by means of brackets 17 on an automobile.

In order to mount a tire on the rim the lever 10 is released from engagement with the lock and pulled to the position shown in dotted lines in Fig. 1 whereupon the rim is contracted. While the lever is moving to the position shown in dotted lines, that portion of the lever between its two pivoted points enters the elongated slot 8 whereupon the parts are permitted to assume the position shown in dotted lines in Fig. 1.

To lock the tire on the rim the lever is thrown to the position shown in full lines in Fig. 1, the catch entering the opening 12 in the lock casing and engaging the spring catch in the lock. In order to hold the lever in locked position, against unauthorized movement, the latch bolt is locked against movement by a suitable key.

In order to regulate tension of the tire on the rim, I provide serrations between the hinge member 5 and the end 3 of the rim so that the hinge member may be adjusted to any desired position and such adjusted position is maintained by the interlocking of the serrations when the bolts 7 are tightened. The end 3 of the rim is provided with elongated slots 6' in which the bolts 7 may slide as the hinge member 5 is adjusted.

What I claim is:—

In a tire carrier, the combination with a split rim, a lug secured to one end of said rim, a slot extending longitudinally in the other end of said rim, said slot being open at the end of the split rim in which it is formed, lugs secured to the end of the rim on each side of said slot, said slot being in alinement with the space between the lugs on the other end of the split rim, a lever pivotally secured at one end to the first named lugs, and, also pivotally secured intermediate its ends between the lugs on the other end of the split rim, that portion of the lever intermediate its pivots being adapted to move in said slot, whereby the rim may be expanded and contracted by moving said lever.

In testimony whereof I affix my signature in the presence of two witnesses.

CHARLES M. JONES.

Witnesses:
S. O. HAWKES,
M. C. JONES.